April 14, 1931.  C. E. TURNQUIST  1,800,706
AUTOMATIC PIE AND CAKE DIVIDING MACHINE
Filed Feb. 14, 1928  4 Sheets-Sheet 1

INVENTOR.
CARL E. TURNQUIST
BY A. B. Bowman
ATTORNEY

April 14, 1931. C. E. TURNQUIST 1,800,706
AUTOMATIC PIE AND CAKE DIVIDING MACHINE
Filed Feb. 14, 1928    4 Sheets-Sheet 2

INVENTOR.
CARL E. TURNQUIST.
BY A.B.Bowman
ATTORNEY

April 14, 1931.  C. E. TURNQUIST  1,800,706
AUTOMATIC PIE AND CAKE DIVIDING MACHINE
Filed Feb. 14, 1928  4 Sheets-Sheet 3

INVENTOR.
CARL E. TURNQUIST.
BY A. B. Bowman
ATTORNEY

April 14, 1931.   C. E. TURNQUIST   1,800,706
AUTOMATIC PIE AND CAKE DIVIDING MACHINE
Filed Feb. 14, 1928   4 Sheets-Sheet 4

INVENTOR.
CARL E. TURNQUIST.
BY A. B. Bowman
ATTORNEY

Patented Apr. 14, 1931

1,800,706

UNITED STATES PATENT OFFICE

CARL E. TURNQUIST, OF LOS ANGELES, CALIFORNIA

AUTOMATIC PIE AND CAKE DIVIDING MACHINE

Application filed February 14, 1928. Serial No. 254,206.

My invention relates to an automatic dividing machine for uniformly dividing pies, cakes, and the like, in equal portions.

The objects of my present invention are: first, to provide a machine of this class having a movable supporting means upon which pies, cakes, or the like, may be positioned, and which supporting means is shifted by the movement of the cutting means; second, to provide a machine of this class having an intermittently rotatable table which may be intermittently rotated portions of a revolution for cutting the pies, cakes, or the like, into corresponding divisions, the table being rotatable by the reciprocation or other movement of the cutting means, thus materially expediting the dividing or cutting of the pie, cake, or the like; third, to provide a machine of this class having a rotatable table, or other supporting means for supporting pie, cake, or the like, to be divided, which supporting means is intermittently rotated a predetermined distance, or portion of a revolution by the backward or inward movement of the knife employed for cutting the pie, cake, or the like, the cutting operation taking place during the movement of the knife in the opposite direction, thus utilizing the inward and outward movements of the knife for the complete operation of the machine for dividing, or cutting pies, cakes, and the like; fourth, to provide novel means for intermittently rotating the supporting table of the machine a predetermined portion of a revolution; fifth, to provide novel means for adjusting the machine so that the supporting table may be rotated various portions of a revolution so that the pie, cake, or the like, may be variously divided, as desired; sixth, to provide a machine of this class having a rotatable supporting table which is normally held in a fixed or non-rotatable position so that the same cannot be accidentally moved, the means for holding the table in a non-rotatable position being released automatically by the means employed for mechanically rotating the table; seventh, to provide novel index means for shifting the table rotating pawl relative to variously spaced notches carried by the table, and also means for positively limiting the movement of the pawl actuating means, whereby the actuating means is shifted a predetermined distance depending upon the position of the pawl; eighth, to provide a novel knife supporting means for a machine of this class; ninth, to provide novel means for imparting the momentum of the inward movement of the knife guide or knife to the table rotating means; tenth, to provide novel means on the knife guide for varying the stroke of the knife so that the knife may be either moved diametrically through the whole of the pie, cake, or the like, or only outwardly from the center thereof; eleventh, to provide, as a whole, a novelly constructed machine for dividing pie, cake, or the like; and, twelfth, to provide a machine of this class which is durable, efficient, easy and simple to adjust and operate and one which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Like characters of reference refer to similar parts and portions throughout the several view of the drawings.

My machine is preferably supported on a unitary supporting frame 1 which may be provided with legs 1a for supporting and securing the machine on a table or other platform. At the central portion of the frame is provided a boss 1b in which is secured, by means of a set screw 2, a vertical stub shaft 3 which is provided with a shoulder, intermediate its ends, resting at the upper face of the boss. On the portion of the shaft 3 extending above the frame 1 is rotatably mounted a disc shaped supporting member 4 having a central downwardly extending hub 4a which is positioned around the shaft. At the upper face of the boss 1b and at the adjacent lower end of the hub 4a, are provided oppositely disposed ball races 1c and 4b, respectively, in which are mounted balls 5e to facilitate the rotation of the supporting member 4 relative to the supporting frame or base 1. About the hub 4a below the plate portion of the supporting member 4, is rotatably mounted the hub portion 5a of the combined gear and arm member 5, the latter member being retained in rotatable position on the hub 4a by means of a collar 5f secured to the lower end of the hub 4a.

Figure 6:
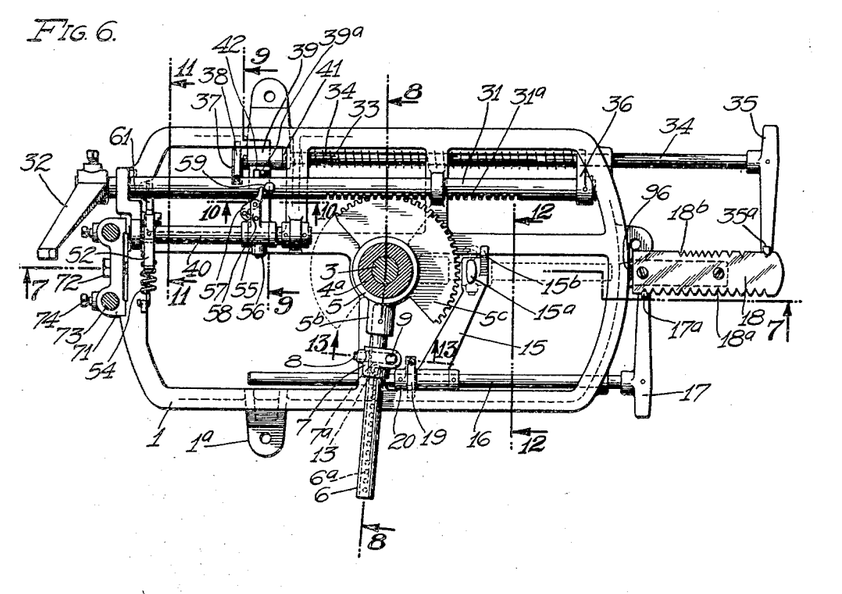
Fig. 6 is a sectional view thereof in plan taken at 6—6 of Fig. 2, showing by dotted lines certain shifted positions of certain members thereof.
Figure 12:
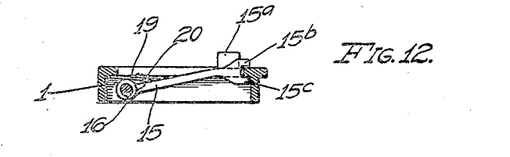
Fig. 12 is a sectional elevational view thereof taken through 12—12 of Fig. 6.
Figure 13:
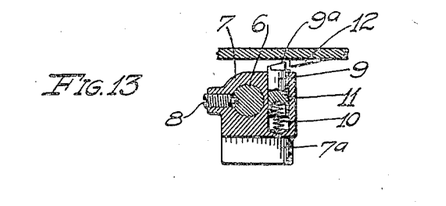
Fig. 13 is an enlarged sectional elevational view thereof taken through 13—13 of Fig. 6 showing the adjustable table rotating pawl means and showing the pawl plunger partially in elevation to facilitate the illustration.

The member 5 is provided at one side of the hub with a radially directed socket 5b and at the other side with a segmental gear 5c. In the socket 5b is mounted the arm 6 which is a round rod and extends radially from the axis of the member 5. On the arm 6 is reciprocally mounted a pawl carrying slide 7 which is held in non-rotatable position thereon by a set screw 8. At one side of the slide 7 is reciprocally mounted in a vertical direction, the pawl plunger 9 which is normally held in an outward or upward position by a compression spring 10 positioned within the recess in which the plunger is positioned and against the inner end of the plunger. This plunger is retained in position by a transverse pin 11, as shown in Fig. 13, but is permitted to move inwardly freely. On the lower side of the supporting disc 4, is provided a plurality of concentric series of circularly arranged notches formed by lugs 12 which are vertical at one side and inclined gradually at the other side, as shown best in Fig. 13. These lugs 12 are positioned different angular distances apart in the several circularly arranged rows of lugs, as shown best in Fig. 3, to provide considerable choice in the division of the pie, cake, or the like, into different size portions, or sectors. As the arm 6 is rotated in one direction, one side of the outer end 9a of the pawl plunger 9 engages the flat or vertical side of one of the lugs 12, rotating the supporting disc 4 a portion of a revolution. Thus, as the arm 6 is rotated in the opposite direction, the inclined outer end of the pawl plunger 9 engages the inclined side of the next lug 12 forcing the plunger inwardly and permitting the pawl plunger to pass to the flat or abutment side of the lug for a new grip on the supporting disc 4 for rotating the same another portion of a revolution. The slide 7 is held in a fixed relation longitudinally on the arm 6 and engages only the lugs in one of the circularly arranged rows of lugs. The positioning of the slide 7 longitudinally on the arm is effected by a catch plunger 13 within and at one side of the slide. This plunger 13 is provided with an inner cone point which is adapted to extend into a plurality of conical recesses 6a at the under side of the arm 6 and is yieldably held in such position by a compression spring 14 positioned against the opposite end of the plunger. The recesses 6a in the arm 6 are spaced apart the same distance as the several concentric circular rows of lugs 12 at the under side of the supporting disc 4. The portion of the slide 7 which extends downwardly from the arm 6 is provided with a transverse channel 7a which is adapted, when the arm 6 is shifted to the position shown by dotted lines in Fig. 6, to receive a lug 15a extending upwardly from the end of the pawl shifting arm 15. The opposite end of the arm 15 is mounted on a rod 16 which is reciprocally mounted at one side of the base 1 and extends beyond the front end of the same. At the forward end of the rod 16 is secured an index finger 17 in the form of a handle. The one end of the finger 17 is provided with an upwardly extending lug 17a which is adapted to extend into one of a number of index notches 18a in the one edge of the index plate 18 mounted at the upper side of a bracket 1d extending forwardly of the main portion of the base. The portion of the index finger engageable with the notches 18a is adapted to be depressed slightly to permit the shifting of the rod 16 inwardly and outwardly and the engagement of the lug 17a at the free end of the index finger with another notch portion in the index plate 18. The free end of the index finger is held against the under side of the index plate by means of a leaf spring 19 secured at one end to a member 20 fixedly secured to the rod 16, as shown in Figs. 6 and 12. The free end of the spring 19 engages the under ledge of the left side of the base, thereby holding the lug 17a in engagement with the notch portions of the plate 18. The rod 16 is rotatable relative to the arm 15 but the latter is prevented from rotating therewith by reason of a pair of lugs 15b and 15c at the free end of the arm 15, which lugs straddle a flange of a longitudinal rib of the base, as shown in Figs. 6 and 12. Thus, when the arm 6 is in the dotted line position, and the lever 15 has not been shifted from the position originally adjusting the position of the slide 7, the transverse channel in the slide will receive the lug 15a. Then when the free end of the index finger 17 is depressed, the rod 16 may be shifted inwardly or outwardly to any desired position moving the arm 15 and the slide 7 a corresponding distance. Thus, when the lug 17a of the index finger is extended into a certain notch, the plunger 9 will engage the lugs 12 in a certain circular row having the same number of lugs as the number indicated opposite the notch on the plate 18 in which the lug 17a is positioned.

Figure 1:
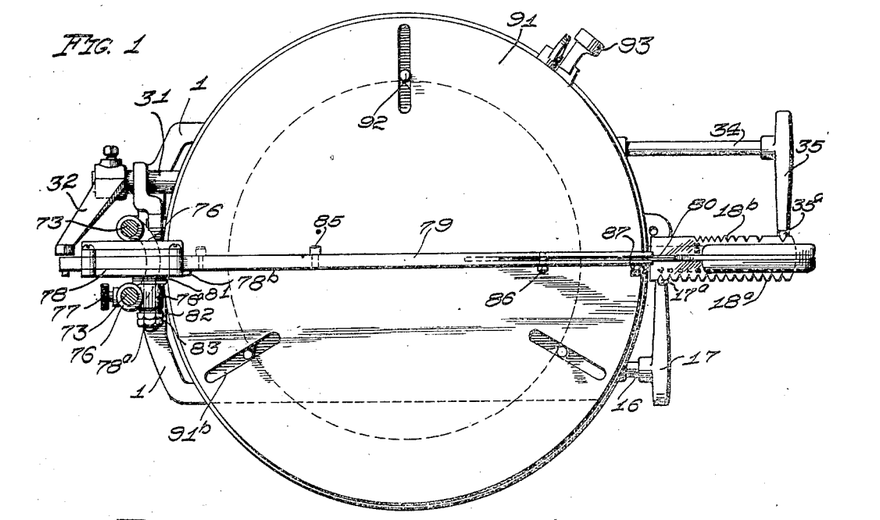
Figure 1 is a plan view of my machine in its preferred form of construction.
Figure 3:
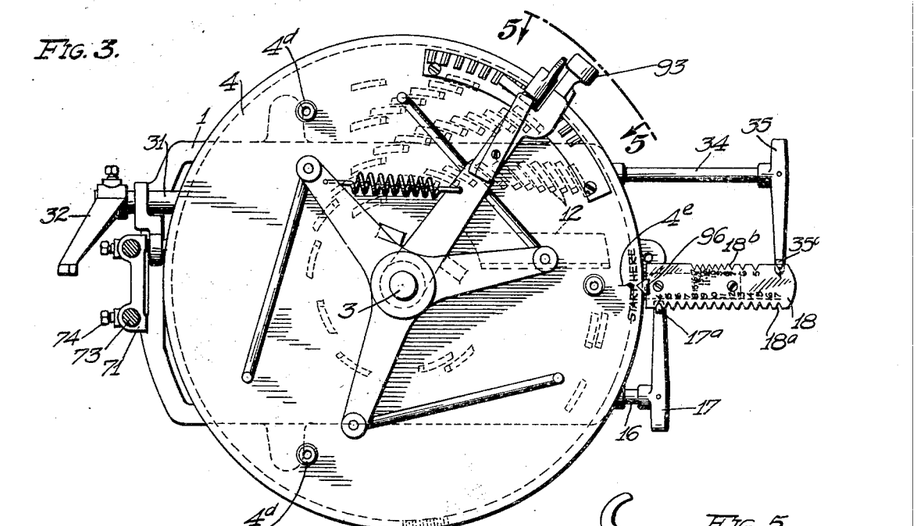
Fig. 3 is a sectional view thereof in plan taken at 3—3 of Fig. 2.
Figure 9:
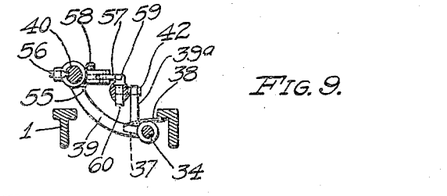
Fig. 9 is a sectional elevational view thereof taken at 9—9 of Fig. 6.
Figure 10:
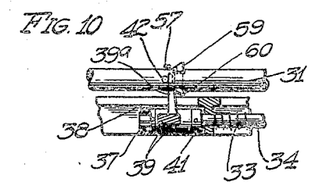
Fig. 10 is a fragmentary sectional elevational view thereof taken at 10—10 of Fig. 6.

The segmental gear 5c is operated by rack teeth 31a provided at one side of the actuating member 31 which is positioned above the base and reciprocally mounted in guide portions thereon longitudinally with respect to the base. This actuating member or rod 31 is adapted to be shifted rearwardly by an upwardly extending arm 32 at the rear end of the member 31 and is adapted to be shifted in the opposite direction by a spring 33 mounted on the index rod 34 which is reciprocally mounted on the base 1 at the opposite side thereof from the index plate. At the outer or forward end of the rod 34 is also secured an index finger 35 similar in construction to the index finger 17, and also provided at its free end and at the upper side with a lug 35a which is adapted to be inserted into other notches 18b at the opposite edge of said plate, as shown in Figs. 1, 3 and 6. The ends of the compression spring 33 are positioned between a web on the base 1, through which the rod 34 extends, and an arm 36 secured to the forward end of the actuating member 31 and positioned around the rod 34. Thus, the spring 33 does not affect in any manner the shiftable movement of the index rod 34. At the rear end of the rod 34 is also provided a spring supporting member 37 to which is secured the one end of a leaf spring 38 which is adapted to engage at its free end the under ledge at the right side of the frame, as shown in Figs. 6 and 9. Near the inner end of the index rod 34 is mounted one end of a slide 39 which extends in curved form around the lower side of the actuating member 31 and is supported at its opposite end on a rotatable pawl actuating guide rod 40. The rod 34 is permitted to rotate relative to the slide 39, but the latter is prevented from moving longitudinally with respect to the rod 34 by the spring supporting member 37 at the front end and by a collar 41 at the rear end thereof, as shown in Figs. 6 and 10. On the connecting portion of the member 39 between the end portions thereof mounted on the rods 34 and 40, is provided an upwardly extending lug 39a which is adapted to be engaged by a lug or pin 42 at the side of the actuating member 31 when the machine is in inoperative position, or in a position to make another cut in the pie, or the like. Thus, the length of the stroke of the actuating member 31, and the consequent angle of oscillation of the segmental gear is dependent upon the position of the rod 34 which is fixed by the position of the index finger 35. It is obvious that, when desiring to cut larger pieces of pie, or the like, greater movement is required of the gear and the actuating member than when smaller portions of pie are desired. Therefore, as the rod 34 is shifted inwardly, the stroke of the actuating member 31 is shortened and the angular movement of the gear, the arm 6, and the supporting disc 4 is shortened. Thus, when the index finger 17 is drawn outwardly so that the pawl plunger 9 is shifted to circles having a greater number of lugs 12, the index finger 35 is shifted inwardly although not a corresponding distance inasmuch as the spacing of the notches 18a is dependent upon the radial spacing of the rows of lugs while the spacing of the notches 18b corresponds with the circumferential spacing between the lugs in the various circular rows of lugs. Inasmuch as the movement or rotation of the supporting disc 4 is not wholly dependent upon the movement of the arm 6 and the pawl plunger carried thereby, the arm 6 may be oscillated a greater distance than the arc between the lugs 12, since the pawl plunger 9 engages the next lug 12 even though the pawl plunger has passed considerably beyond said lug. Therefore, I have provided less notches 18b in the index plate 18 than circular rows of notches or lugs 12, the most inwardly positioned notch 18b taking care of the arcuate movement of the arm 6 when the slide 7 is positioned in any one of its three outer positions. The next two outwardly positioned notches 18b each take care of two positions of the slide 7 on the arm 6.

Figure 11:
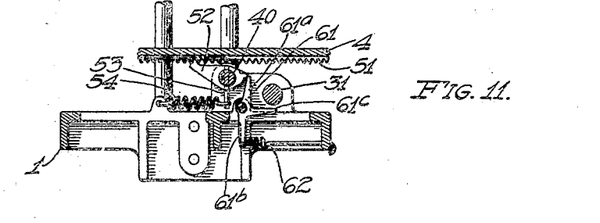
Fig. 11 is a fragmentary sectional elevational view thereof taken at 11—11 of Fig. 6.

In order to prevent the supporting disc 4 from being rotated accidentally, I have provided a ratchet and pawl means in connection therewith, said means consisting of a plurality of small ratchet teeth 51 at the under side of the outer edge of the supporting disc and extended radially therewith, and a pawl 52 non-rotatably secured, by means of a pin 53, on the pawl shifting guide rod 40 near the rear end thereof, as shown best in Figs. 6 and 11. The free end of the pawl 52 is held in engagement with the teeth 51 by a spring 54 secured at one end to a lug on the base and at its opposite end to the pin 53 which extends downwardly from the pawl, also shown in Figs. 6 and 11. It will be noted that the teeth 51 are preferably inclined at the opposite sides so that the included angle between the adjacent sides is approximately sixty degrees so that the supporting disc 4 may be rotated even though the pawl 52 is engaged therewith when slight force is applied on the supporting disc in an attempt to rotate the same.

The end of the slide 39 mounted on the rod 40 is bifurcated. On this rod 40, between the furcations of the slide 39, is mounted a pawl support 55 which is adapted to be shifted with the slide 39 but is keyed to the rod 40, by means of a screw 56 so that when the pawl support 55 is rotated the rod 40 is also rotated, disengaging the pawl 52 from the teeth 51. At the side of the pawl support 55 adjacent the actuating member 31, is provided a bifurcated lug on which is pivotally mounted a pawl 57 which is held with one end against the rear side of the bifurcated lug by means of a spring 58 and with its other end extended outwardly over the upper side of the actuating member 31. On the actuating member 31, are mounted a pair of cams 59 and 60 which may be formed by a single pin extending transversely through the actuating member 31 with its opposite ends extending therefrom. The cams 59 and 60 are formed by beveling the opposite ends of the pin backwardly and toward the actuating member. The cam pin is positioned immediately behind the outer end of the pawl 57 so that the same is engaged by the cam 59 when the actuating member is shifted rearwardly, raising the outer end of the pawl 57, and rotating the pawl support 55, the rod 40 and the pawl 52. As the pawl 52 is rotated and freed from the teeth 51, one of the arms 61a of the T-shaped trip member 61 engages the end of the pawl 52 opposite the end adapted to engage the teeth 51, holding the pawl 52 in disengaged relation from the teeth 51. The trip member 61 is pivotally mounted at the intersecting portion of its arms with one arm 61b extending downwardly and another arm 61c extending laterally immediately below the actuating member 31. The arm 61a holds the pawl 52 away from the teeth 51 by means of a spring 62 secured at one end to the end of the arm 61b and at its opposite end to the base 1, as shown in Fig. 11. As the pawl 52 is disengaged from the teeth 51 when the actuating member 31 is shifted rearwardly, the arm 61c of the trip member 61 is engaged by the cam 60 when the actuating member 31 reaches the end of its rearward stroke, rotating the trip member 61 permitting the pawl 52 to again engage the teeth 51 and permitting the end of the arm 61a to be positioned against the extreme outer end of the trip end of the pawl 52 when the actuating member 31 if forced toward the front end of the machine by the spring 33. Thus, the pawl 52 is held in engagement with the teeth 51 at all times except when the actuating member 31 is shifted rearwardly and until the actuating member reaches the end of its rearward stroke.

At the rear end of the base 1, is mounted a knife guide supporting rod bracket 71 which is preferably secured to the base by bolts 72 so that the bracket may be readily removed or shimmed relative to the base for aligning the knife guide with respect to the axis of the rotating table. At the opposite sides of the bracket 71, are mounted the lower ends of the knife guide supporting rods 73, which may be secured to the bracket by screws 74. These rods are preferably connected at their upper ends by a tie member 75. On these rods 73 is reciprocally mounted a knife guide supporting slide 76 which may be secured in any position thereon by a thumb screw 77, shown in Figs. 1 and 2. At one side of the slide 76, is provided a journal portion 76a having a bore extending transversely with respect to the rods 73 and parallel to the plane passing through both of the rods. In this bore is pivotally mounted the pivotal portion 78a of the knife guide support 78 in which is reciprocally mounted the knife guide 79 supporting a knife 80 at its free end. Between the body of the support 78 in which the guide 78 is mounted and the journal portion 76a of the slide 76, is positioned a leather or other friction creating washer 81. The support 78 is held tightly against the washer 81 and the journal portion 76a by a spring washer 82, positioned against the other side of the journal portion 76a, and a pair of nuts 83 secured to the end of the pivot portion 78a. Thus, when the knife guide 79 is tilted with respect to the slide 76, the former is held frictionally in the shifted position.

Figure 7:
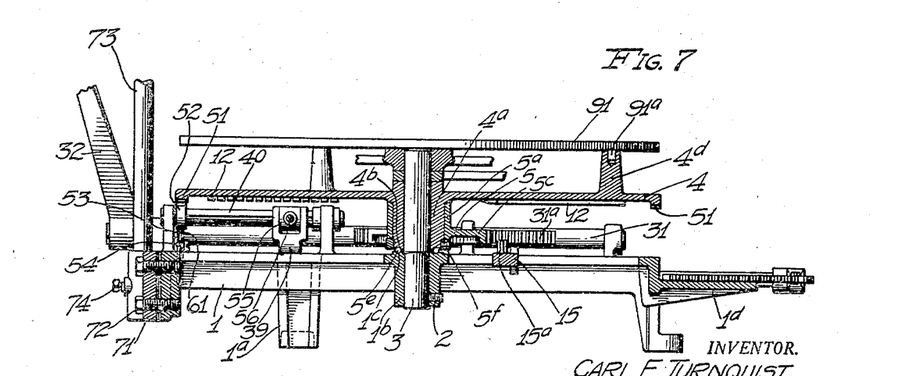
Fig. 7 is a fragmentary sectional elevational view thereof taken at 7—7 of Fig. 6.
Figure 8:
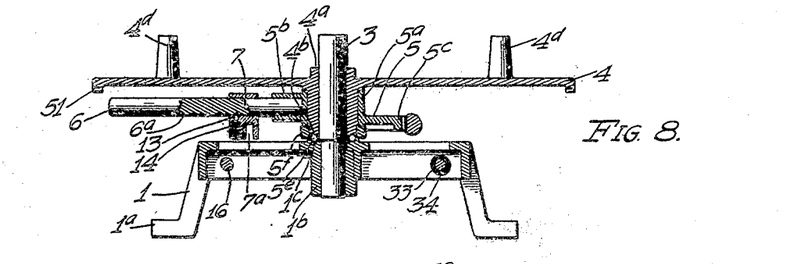
Fig. 8 is a sectional elevational view thereof taken at 8—8 of Fig. 6.

Mounted on and extending upwardly from the supporting disc 4, are a plurality of table supporting lugs 4d having recesses at their upper ends for receiving downwardly extending pins 91a of the upper table or rotatable support 91 which is removably supported on said lugs and above the vertical pivot shaft 3, as shown best in Fig. 7. On this table, is positioned the pie, cake, or the like, or the receptacle containing the same, as shown by dotted lines in Figs. 1 and 2. The receptacle containing the pie, cake, or the like, or the article itself, may, and is preferably, held in position on the upper side of the table 91 and centralized with respect to its rotating axis by a plurality of jaws 92, preferably three in number, which extend upwardly through radial slots 91b in the table 91, as shown in Fig. 1. These jaws are shifted inwardly and outwardly by a control lever 93 extending outwardly from the pivotal axis of the table between the table and the supporting disc 4, as shown best in Figs. 3, 4 and 5. The means for securing the pie, cake, or the like, in position on and for centralizing the same with respect to the axis of rotation of the table, does not form a part of this invention but is more specifically illustrated and described in my copending application for pie and cake dividing machines, filed in the United States Patent Office, November 18th, 1926, Serial No. 149,237.

Figure 2:
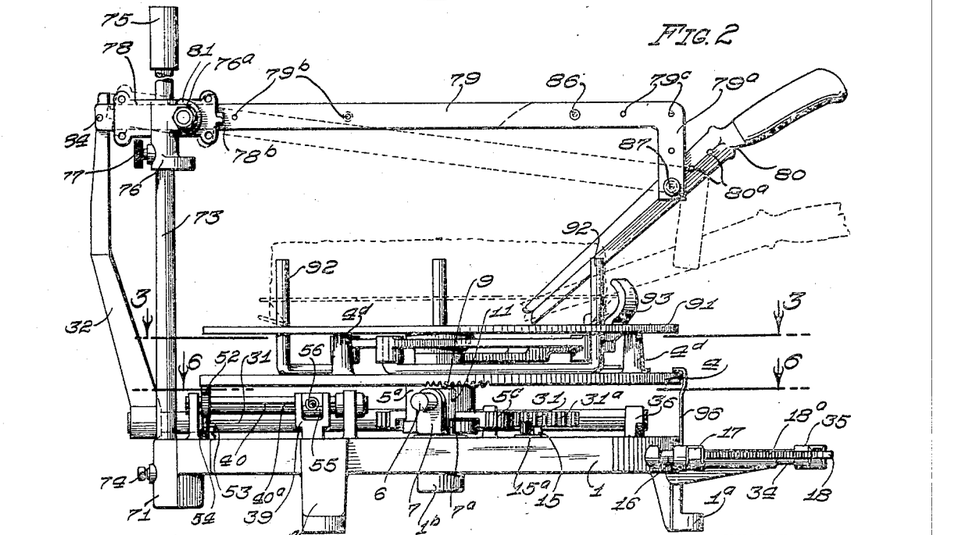
Fig. 2 is a side elevational view thereof showing by dotted lines a pie pan and also a cake in position on the rotatable table, and also the knife guide and knife in a shifted position.

The knife guide 79 extends across the upper side of the pie, cake, or the like, and a slight distance above the same and extends through the central portion or axis of the pie, cake, or the like, the receptacle containing the same, and the table 91. As the knife 80 is drawn outwardly from the support 78 and inclined to the position shown in Fig. 2, an incision is made radially either from the center outwardly to the circumference or completely across the pie, or the like, depending upon whether an uneven or an even number of divisions is desired. The outer position of the knife guide 79 is preferably limited by a pin 84 which engages the rear end of the support 78, as shown in Figs. 1 and 2. The knife guide is preferably bent outwardly at its forward end, as indicated by 79a. This portion and also the horizontal portion immediately adjacent thereto are provided with longitudinal vertical slots in which the knife is positioned, the knife being pivotally mounted intermediate its ends on the guide by a movable pin 87 either on the downwardly extending portion or the horizontal portion of the guide. Both the knife guide 79 and the knife itself may be provided with a plurality of holes 79c and 80a, respectively, for variously connecting the knife to the knife guide. The downwardly bent portion of the knife guide is primarily adapted for dividing cakes so that when the knife reaches the end of its cutting stroke the knife may be lowered to a considerable extent so that a crusty icing on the cake cannot be easily broken which might occur when the knife is in a more upright position and attempt is made to pull the knife directly outwardly through the edge of the cake instead of drawing the knife downwardly. The downwardly bent portion of the knife guide substantially forms an arch so that the guide does not engage the cake when the former is drawn downwardly.

In the knife guide, are provided a pair of transverse holes 79b into one of which is adapted to be positioned an actuating pin 85, as shown in Figs. 1 and 2. This pin is adapted to pass through the support 78, as shown best in Fig. 4, and is adapted to engage the upwardly extended end of the lever 32 for shifting the actuating member 31 to which it is attached for rotating the supporting disc 4 and the table 91. If a complete cut is made across the pie, cake, or the like, the knife guide 79 is shifted inwardly a greater distance and in this event the actuating pin 85 is positioned, as shown by solid lines in Fig. 1. If only a short cut is made from the center outwardly, the actuating pin 85 is positioned as shown by dotted lines in Fig. 1. Thus, the lever 32 is shifted the same distance whether a long or short cut is made. The inward shifting of the knife guide 79 is limited by a stop pin 86 mounted on the knife guide at the side opposite the pin 85, which stop pin 86 is adapted to engage a stop lug 78b at the front end of the support 78.

In order to place the pie, cake, or the like, on the supporting table 91, or to remove the same from the table, the knife guide 79 is shifted upwardly about its pivotal axis and is frictionally held in such position.

Figures 4, 5:
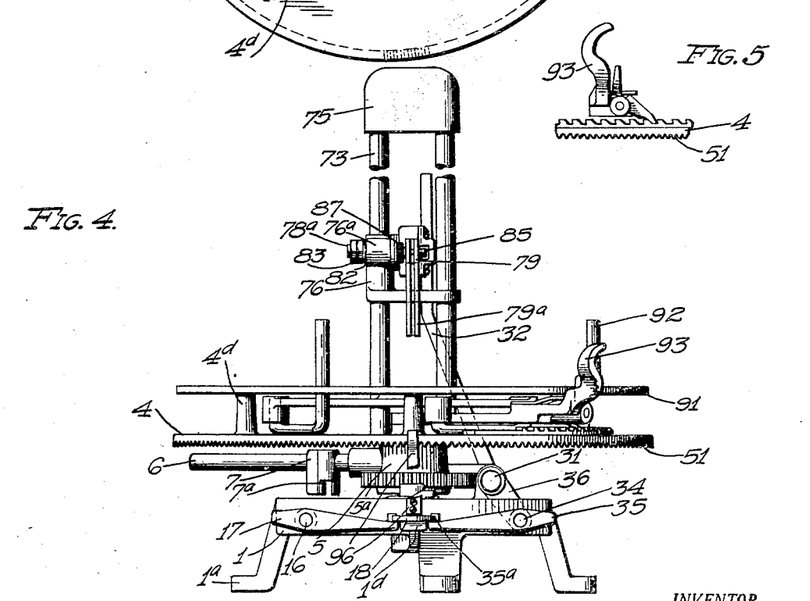
Fig. 4 is a fragmentary elevational view thereof with the knife removed.
Fig. 5 is a fragmentary elevational view thereof taken at 5—5 of Fig. 3.

The operation of the machine is as follows:

Assuming the machine to be set for dividing a pie, cake, or the like, into four equal divisions, both index fingers are positioned, as shown by solid lines in Figs. 1, 3 and 6, opposite the designations "4" on the index plate. The divisions being of an even number, the actuating pin 85 on the knife guide 79 is positioned as shown by solid lines, permitting the knife guide and the knife to be shifted rearwardly so that a cut may be made completely across the pie, or the like. As the knife guide is shifted rearwardly with the sharp end of the knife in a raised position, the actuating member 31 is also shifted rearwardly rotating the arm 6 and permitting the pawl plunger 9 thereon to engage one of the lugs 12 in the inner circle row of such lugs, rotating the supporting disc 4 until the arm reaches the position shown by dotted lines in Fig. 6. This operation of the rearward and outward shifting of the knife is repeated until the pie, or the like, is cut as desired. If it is desired to change the machine to cut the greater number of divisions, the knife guide 79 is shifted rearwardly only a portion of its distance, releasing the pawl 52 from the teeth 51, rotating the table 91 and the supporting disc 4 to such position in which the starting line, designated 4e in Fig. 3, is opposite the finger 96 mounted on the base and extending upwardly adjacent the edge and to the peripheral portion of the upper side of the supporting disc 4, as shown in Figs. 2, 3 and 4. The knife guide 79 is then shifted to the end of its rearward stroke, permitting the arm 6 to be shifted to its dotted line position in Fig. 6, permitting the channel portion of the slide 7 to extend over the lug 15a on the lever 15. While the knife guide is held in its rearward position, the index finger 17 is rotated in a clockwise direction and pulled outwardly until the lug 17a thereof is opposite the notch 18a bearing the number into which the pie, or the like, is to be divided. The index finger 17 is then released permitting the lug 17a to be inserted into and retained in the desired notch by the spring 19. The index finger 35 is then turned in a counter clockwise direction and shifted inwardly until the lug 35a thereof is opposite the notch 18b correspondingly numbered to the notch 18a in which the lug 17a is positioned. The index finger 35 is then released permitting the lug 35a to be inserted into the required notch and retained therein by means of the spring 38. The adjustment of the index finger 35 positions the stop 39a so that the spring 33 cannot force the actuating member 31 forwardly only a certain distance. The position of the actuating member 31, limited by the engagement of the pin 42 with the lug 39a, determines the distance which the actuating member 31 is reciprocated during each stroke and consequently the angle of oscillation of the arm 6, whereby the movement of the arm 6 is so limited that the pawl plunger 9 cannot pass over more than one lug 12 in the circle of lugs, in line with which the pawl plunger is positioned.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a machine of the class described, a rotatable table, a knife reciprocally mounted above the same with its blade adapted to be directed toward said table, and means adapted to connect said knife with said table for rotating the latter when said knife is reciprocated in one direction, means for checking the rotation of the table when the knife is reciprocated in the opposite direction, and means for holding the checking means in disconnected relation from the table when the knife is moved in the former direction.

2. In a machine of the class described, a rotatable support, a knife reciprocally mounted above the same, and means for rotating said support a portion of a revolution when said knife is reciprocated in one direction, means for checking the rotation of the table when the knife is reciprocated in the opposite direction, and means for holding the checking means in disconnected relation from the table when the knife is moved in the former direction.

3. In a machine of the class described, an intermittently rotatable support provided with a series of variously circumferentially spaced notch means, means for controlling the intermittent rotation of said support, index means for adjusting said control means relative to the several series of notch means, means for intermittently actuating said control means, and other index means for adjusting said actuating means.

4. In a machine of the class described, an intermittently rotatable support provided with a series of variously circumferentially spaced notch means, means for controlling the intermittent rotation of said support, index means for adjusting said control means relative to the several series of notch means, means for intermittently actuating said control means, and a knife movably mounted adjacent said support and operatively connected to said actuating means.

5. In a machine of the class described, an intermittently rotatable support provided with a series of variously circumferentially spaced notch means, means for controlling the intermittent rotation of said support, index means for adjusting said control means relative to the several series of notch means, means for intermittently actuating said control means, and a knife reciprocally mounted adjacent said support and adapted, when shifted in one direction, to actuate said actuating means.

6. In a machine of the class described, an intermittently rotatable support provided with a series of variously circumferentially spaced notch means, means for controlling the intermittent rotation of said support, index means for adjusting said control means relative to the several series of notch means, means for intermittently actuating said control means, and rotation checking means in connection with said support and said actuating means, said checking means being controlled by the movement of the actuating means.

7. In a machine of the class described, a rotatable support, means for mechanically and intermittently rotating said support, and means for checking the rotation of said support during the interval between the operation of the former means, and means for holding the checking means in disengaged relation from the support when the latter is rotated.

8. In a machine of the class described, a rotatable support, means for intermittently rotating said support, and rotation checking means in connection with said actuating means for checking the rotation of said support, said checking means being shiftable to an inoperative position when said actuating means is shifted in one direction, and shiftable to its operative position for preventing the rotation of said support when said actuating means is shifted in the opposite direction.

9. In a machine of the class described, a rotatable support, gear means for intermittently rotating said support, pawl and notch means in connection with the support for normally preventing the rotation of the latter, and means in connection with the gear means and the pawl and notch means for disengaging the pawl of the notch means from the notches thereof when said support is rotated in one direction and for permitting said pawl to engage said notches when the gear means is in its normal inoperative position.

10. In a machine of the class described, an intermittently rotatable table, gear and rack means for intermittently rotating said table when the rack of said gear and rack means is shifted in one direction, ratchet means on said table, a pawl pivotally mounted adjacent said table and adapted normally to engage the teeth of said ratchet, and cam means in connection with said rack for releasing said pawl from the teeth of said ratchet when said rack is shifted in a direction for rotating said table and for releasing said pawl to engage the teeth of said ratchet when said rack is shifted to the end of its table rotating stroke.

11. In a machine of the class described, a rotatable support, gear means for intermittently rotating said support, pawl and notch means in connection with the support for normally preventing the rotation of the latter, and means in connection with the gear means and the pawl and notch means for disengaging the pawl of the notch means from the notches thereof when said support is rotated in one direction and for permitting said pawl to engage said notches when the support is at rest.

12. In a machine of the class described, a rotatable table having a series of variously circumferentially spaced notches, a variously shiftable pawl mounted adjacent said table adapted to engage said notches, means for shifting said pawl for rotating said table, stop and index means for regulating and limiting the movement of said first mentioned means for limiting the rotation of said table, said table having a ratchet, a pawl yieldably engaging the teeth of said ratchet, and cam means on the means for shifting the first mentioned pawl, said cam means releasing said second pawl from the teeth of said ratchet when said table is rotated, and tripping said second pawl for permitting engagement thereof with said teeth when said first mentioned means is shifted to the end of its stroke.

13. In a machine of the class described, a rotatable table having a series of variously spaced notches, a pivotally mounted arm adjacent said table, a pawl slidable on said arm adapted to engage the notches on said table, a gear at the pivotal axis of said arm, and a rack for oscillating said gear.

14. In a machine of the class described, a rotatable table having a series of variously spaced notches, a pivotally mounted arm adjacent said table, a pawl slidable on said arm adapted to engage the notches on said table, and an index means adapted to be operatively connected with said pawl when the latter is shifted to the end of its table rotating stroke for shifting said pawl on said arm.

15. In a machine of the class described, a rotatable table having a series of variously spaced notches, a pivotally mounted arm adjacent said table, a pawl slidable on said arm adapted to engage the notches on said table, means for rotating said arm, and stop and index means for controlling the movement of the means adapted to rotate said arm.

16. In a machine of the class described, a rotatable table having a series of variously spaced notches, a pivotally mounted arm adjacent said table, a pawl slidable on said arm adapted to engage the notches on said table, a reciprocal member for rotating said arm, a knife reciprocally mounted above the table, and means operatively connecting the knife with said reciprocal member for reciprocating the latter.

17. In a machine of the class described, a rotatable table having a series of variously spaced notches, a pivotally mounted arm adjacent said table, a pawl slidable on said arm adapted to engage the notches on said table, a reciprocal member for rotating said arm, and an index means adapted to shift said reciprocal member for limiting its movement in one direction.

18. In a machine of the class described, a rotatable table having a series of variously spaced notches, a pivotally mounted arm adjacent said table, a pawl slidable on said arm adapted to engage the notches on said table, a reciprocal member for rotating said arm, a spring in connection with said reciprocal member for forcing the same in one direction, and an index means provided with a stop adapted to be engaged by said reciprocal member for limiting the action of said spring.

19. In a machine of the class described, a rotatable table having a series of variously spaced notches, a pivotally mounted arm adjacent said table, a pawl slidable on said arm adapted to engage the notches on said table, a reciprocal member for rotating said arm, and means for operating said reciprocal member, a ratchet on said table, a second pawl adapted to engage said ratchet, and means in connection with said second pawl and said reciprocal member for releasing said second pawl from engagement with said ratchet when said reciprocal member is shifted in one direction.

20. In a machine of the class described, a rotatable table having a series of variously spaced notches, a pivotally mounted arm adjacent said table, a pawl slidable on said arm adapted to engage the notches on said table, a reciprocal member for rotating said arm, and means for operating said reciprocal member, a ratchet on said table, a second pawl adapted to engage said ratchet, and means in connection with said second pawl and said reciprocal member for releasing said second pawl from engagement with said ratchet when said reciprocal member is shifted in one direction, and trip means in connection with said second pawl for releasing the latter when said reciprocal member is shifted to the end of its operating stroke.

21. In a machine of the class described, a rotatable table having a series of variously spaced notches, a pivotally mounted arm adjacent said table, a pawl slidable on said arm adapted to engage the notches on said table, a reciprocal member for rotating said arm, and pawl and ratchet means in connection with said table for normally checking the rotation thereof, and cam means in connection with said reciprocal member for actuating said pawl and ratchet means for permitting rotation of said table when said reciprocal member is shifted in one direction, and other means in connection with said pawl and ratchet means for tripping the pawl of the latter means when said reciprocal member is shifted to the end of its operating stroke.

22. In a machine of the class described, a rotatable table having a series of variously spaced notches, a pivotally mounted arm adjacent said table, a pawl slidable on said arm adapted to engage the notches on said table, a gear carried by said arm, a rack for actuating said gear and provided with a stop, an index member reciprocally mounted adjacent thereto and provided with a stop, a spring in connection with said index member adapted normally to force the stop of said rack against the stop of said index member, and means for reciprocating said rack.

23. In a machine of the class described, a rotatable table having a series of variously spaced notches, a pivotally mounted arm adjacent said table, a pawl slidable on said arm adapted to engage the notches on said table, a gear carried by said arm, a rack for actuating said gear and provided with a stop, an index member reciprocally mounted adjacent thereto and provided with a stop, a spring in connection with said index member adapted normally to force the stop of said rack against the stop of said index member, a ratchet on said table, a pawl adapted normally to engage said ratchet, a tiltable arm in connection with said second pawl for disengaging the same from said ratchet, and means for actuating said tiltable arm when said rack is shifted in one direction.

24. In a machine of the class described, a rotatable table having a series of variously spaced notches, a pivotally mounted arm adjacent said table, a pawl slidable on said arm adapted to engage the notches on said table, a gear carried by said arm, a rack for actuating said gear and provided with a stop, an index member reciprocally mounted adjacent thereto and provided with a stop, a spring in connection with said index member adapted normally to force the stop of said rack against the stop of said index member, a ratchet on said table, a pawl adapted normally to engage said ratchet, a tiltable arm in connection with said second pawl for disengaging the same from said ratchet, means of actuating said tiltable arm when said rack is shifted in one direction, and trip means in connection with said second pawl adapted to be engaged by said rack when the same is shifted to the end of its operating stroke.

In testimony whereof, I have hereunto set my hand at Los Angeles, California, this 25th day of Nov., 1927.

CARL E. TURNQUIST.